United States Patent [19]

Rehmer et al.

[11] Patent Number: 5,026,806

[45] Date of Patent: Jun. 25, 1991

[54] UV-CROSSLINKABLE MATERIALS BASED ON ISOAMYL (METH)ACRYLATE COPOLYMERS

[75] Inventors: Gerd Rehmer, Beindersheim; Andreas Boettcher, Nussloch; Peter Pfoehler, Speyer; Oral Aydin, Mannheim; Gerhard Nestler, Ludwigshafen, all of Fed. Rep. of Germany

[73] Assignee: BASF Aktiengesellschaft, Ludwigshafen, Fed. Rep. of Germany

[21] Appl. No.: 417,698

[22] Filed: Oct. 5, 1989

[30] Foreign Application Priority Data

Oct. 31, 1988 [DE] Fed. Rep. of Germany ....... 3836968

[51] Int. Cl.$^5$ ............................................ C08F 216/36
[52] U.S. Cl. .................................. 526/316; 526/361; 526/313; 526/291; 522/90
[58] Field of Search ............... 526/316, 301, 313, 291; 522/90

[56] References Cited

U.S. PATENT DOCUMENTS 4,148,987  4/1979  Winey .
4,737,559  4/1988  Kellen et al. ...................... 526/291

FOREIGN PATENT DOCUMENTS 3613082  11/1986  Fed. Rep. of Germany .
0922172  3/1963  United Kingdom .

Primary Examiner—Paul R. Michl
Assistant Examiner—T. McDonald, Jr.
Attorney, Agent, or Firm—Oblon, Spivak, McClelland, Maier & Neustadt

[57] ABSTRACT

Materials which are cross-linkable by ultraviolet radiation under atmospheric oxygen and are based on (meth)acrylate copolymers having a K value of from 10 to 100 are obtained by free radical polymerization, in the presence or absence of a solvent, of a) from 5% to 97.4% by weight of isoamyl acrylate and/or isoamyl methacrylate,
b) from 9% to 89.9% by weight of (methacrylates whose homopolymers have a glass transition temperature below −30° C.,
c) from 2.5% to 30% by weight of $\alpha,\beta$-monoolefinically unsaturated compounds whose homopolymers have a glass transition temperature above −30° C.,
d) from 0% to 10% by weight of monoolefinically unsaturated acids and/or their anhydrides and
e) from 0% to 20% by weight of further olefinically unsaturated monomers having one or more of the following functional groups: hydroxyl, amide, epoxide, ether, ester, urethane, urea, primary, secondary and tertiary amine and ether groups, and
f) from 0.1% to 5% by weight of a copolymerizable benzophenone derivative or acetophenone derivative, the sum of the percentages by weight X (=a+b+c+d+f) being 100 in each case.

9 Claims, No Drawings

UV-CROSSLINKABLE MATERIALS BASED ON ISOAMYL (METH)ACRYLATE COPOLYMERS

The present invention relates to UV-crosslinkable materials, in particular hotmelt (contact) adhesives and sealing compounds, in particular hotmelt contact adhesives, which can be crosslinked by exposure to ultraviolet light and which have a low melt viscosity and high reactivity toward UV radiation. After exposure to ultraviolet light, the hotmelt adhesives should have high tack, a high peeling strength and high shear strength, in particular at elevated temperatures.

The introduction of modern production methods which are distinguished by the careful use of energy and raw materials and an environmentally sound approach is tied to the development of appropriate products Contact adhesives should have permanent tack, good flow behavior on various surfaces and a balanced amount of adhesion and cohesion As a rule, contact adhesives are used to coat sheet-like substrates and, for example, self-adhesive tapes and self-adhesive labels are produced in this manner.

Frequently, the contact adhesive has to be applied to the particular substrate as a solution in organic solvents and the solvent then evaporated off, so that in general a recovery plant for the solvent is required, since otherwise serious environmental pollution by solvent vapors would occur.

Although such disadvantages are avoided by the use of aqueous contact adhesive dispersions, the drying of aqueous formulations requires large amounts of energy and permits only relatively low production rates with thick adhesive layers The most advantageous method for applying contact adhesives is to apply a melt of the adhesive, since in this case no solvents have to be separated off.

The contact adhesives used here are, for example, copolymers of styrene and isoprene or butadiene, as described in, for example, U.S. Pat. No. 3,229,478. However, hotmelt adhesives of this type require temperatures of, in general, above 180° C. to achieve sufficient flow during the coating process. Furthermore, these polymers have little stability to atmospheric oxygen, heat, light and solvents. Moreover, adhesive bonds produced with such hotmelt adhesives have only poor heat stability.

German Laid-Open Application DOS 3,613,082 describes radiation-crosslinkable contact adhesives based on polyesters containing (meth)acryloyl groups. The products are prepared by an expensive multistage process. After the addition of a photoinitiator, these products can be crosslinked by exposure to ultraviolet light. However, in order to achieve adequate shear strengths of the adhesive bonds, these products must be exposed under an inert gas atmosphere. However, their tack remains poor.

German Laid-Open Application DOS 2,411,169 describes contact adhesives based on (meth)acrylate copolymers, the said adhesives containing, inter alia, reaction products of glycidyl methacrylate with 4-hydroxybenzophenone as copolymerized units. Although these copolymers can be applied in the form of melts, they do not have a balanced amount of tack and shear strength. Furthermore, their reactivity toward UV radiation is low.

U.S. Pat. No. 4,737,559 describes contact adhesives which are dissolved in organic solvents, crosslinkable by ultraviolet light and based on (meth)acrylate copolymers, the said adhesives containing monoethylenically unsaturated aromatic ketones as copolymerized units. However, their high melt viscosity and poor UV reactivity makes them unsuitable for use as hotmelt contact adhesives.

Furthermore, a number of contact adhesive formulations for UV curing are known, the said formulations containing olefinically unsaturated monomers as viscosity-regulating reactive diluents. Good contact adhesive properties are obtained with these formulations only when exposure is effected under an inert gas atmosphere. Furthermore, the use of irritant monomers in such formulations necessitates special occupational hygiene measures.

There is therefore a need for hotmelt contact adhesives which can be crosslinked in the air, have high reactivity on UV radiation, are free of solvents and unsaturated monomers and have little odor, show very little discoloration, are virtually colorless, have a sufficiently low melt viscosity at temperatures below 120° C. and, in the crosslinked state, have high tack, a high shear strength and a high peeling strength.

We have found, surprisingly, that materials which are crosslinkable by ultraviolet radiation under atmospheric oxygen and are based on (meth)acrylate copolymers (A) having a K value of from 10 to 100 are obtained by free radical polymerization, in the presence or absence of a solvent, of a) from 5 to 97.4% by weight of isoamyl acrylate and/or isoamyl methacrylate, b) from 0 to 89.9% by weight of (meth)acrylates whose homopolymers have a glass transition temperature below $-30°$ C., c) from 2.5 to 30% by weight of $\alpha,\beta$-monoolefinically unsaturated compounds whose homopolymers have a glass transition temperature above $-30°$ C., d) from 0 to 10% by weight of monoolefinically unsaturated acids and/or their anhydrides and e) from 0 to 20% by weight of further olefinically unsaturated monomers having one or more of the following functional groups: hydroxyl, amide, epoxide, ether, ester, urethane, urea, primary, secondary and tertiary amine and ether groups, and f) from 0.1 to 5% by weight of a copolymerizable benzophenone derivative or acetophenone derivative, the sum of the percentages by weight X ($=a+b+c+d+f$) being 100 in each case.

The monomers (a) are essential components of the copolymers (A) and are present in the latter in amounts of from 5 to 97.4% by weight. Copolymers which contain more than 15% by weight of isoamyl (meth)acrylate are preferred, those containing more than 25% by weight of isoamyl (meth)acrylate as copolymerized units being particularly preferred.

The copolymers (A) contain, as (meth)acrylates (b), those whose homopolymers have glass transition temperatures below $-30°$ C., for example 2-ethylhexyl acrylate, n-butyl acrylate, isooctyl acrylate and n-heptyl acrylate.

Furthermore, the copolymers (A) contain from 2.5 to 30% by weight of $\alpha,\beta$-monoolefinically unsaturated compounds (c) as copolymerized units, the homopolymers of these compounds having glass transition temperatures above $-30°$ C., for example methyl methacrylate, vinyl acetate, ethyl acrylate, methyl acrylate and isobutyl acrylate.

The copolymers (A) contain, as monomers (d), from 0 to 10% by weight of α,β-monoolefinically unsaturated acids and/or their anhydrides as copolymerized units. Of this monomer species, mono- and/or dicarboxylic acids of 3 to 6 carbon atoms and/or their anhydrides and/or the half esters of the dicarboxylic acids, for example acrylic acid, methacrylic acid, maleic acid, fumaric acid, itaconic acid, maleic anhydride, itaconic anhydride, vinylphosphonic acid, vinylsulfonic acid, mono-n-butyl maleate, monoisoamyl maleate or monoisooctyl maleate, are noteworthy. The copolymers (A) preferably contain acrylic and/or methacrylic acid in amounts of from 0.5 to 6% by weight as copolymerized units.

The monomers (e) include α,β-monoolefinically unsaturated compounds, for example N-vinylformamide, N-vinylpyrrolidone, 2-hydroxyethyl (meth)acrylate, tetrahydrofurfur-2-yl (meth)acrylate and glycidyl (meth)acrylate.

The copolymers (A) contain from 0.1 to 5% by weight of copolymerizable benzophenone derivatives and/or acetophenone derivatives (f), preferably in amounts of from 0.25 to 1.5% by weight.

Such compounds (f) are disclosed in, for example, U.S. Pat. Nos. 3,214,492, 3,429,852, 4,148,987 and 4,737,559 and German Laid-Open Application DOS 2,411,169, for example p-acryloxybenzophenone, p-methacryloxybenzophenone, o-acryloxybenzophenone, o-methacryloxybenzophenone and p-(meth)acryloxyethoxybenzophenone, preferably p-methacryloxybenzophenone. It is also possible to use mixtures of o-methacryloxybenzophenone and p-methacryloxybenzophenone. Copolymerizable benzophenone derivatives are particularly preferred, especially those which are derived from unsubstituted or substituted benzophenonecarboxylic acids, such as 2-benzophenonecarboxylic acid or 3-benzophenonecarboxylic acid, and very particularly those which are derived from 4-benzophenonecarboxylic acid. These very particularly preferred derivatives include the monoesters of benzophenonecarboxylic acid with monohydroxyalkyl (meth)acrylates having 2 to 12 methylene groups, preferably those having 3 to 8 methylene groups, between the hydroxyl group and the (meth)acryloxy group, for example the ester of 4-benzophenonecarboxylic acid with 1,4-butanediol mono(meth)acrylate, 1,2-ethanediol mono(meth)acrylate or 1,8-octanediol mono(meth)acrylate.

Copolymers (A) having a Staudinger index of from 0.1 to 1.00 100 ml/g are used as hotmelt contact adhesives; copolymers having a Staudinger index of from 0.11 to 0.49 100 ml/g are particularly preferred, and those having a Staudinger index of from 0.20 to 0.35 100 ml/g are very particularly preferred.

Copolymers (A) which contain isoamyl acrylate and/or isoamyl methacrylate, i.e. the ester of (meth) acrylic acid with 3-methylbutan-l-ol (isoamyl alcohol) in amounts of from 5 to 97.4, particularly preferably from 25 to 95, % by weight as copolymerized units can be particularly advantageously used for UV-crosslinkable hotmelt contact adhesives and UV-crosslinkable hotmelt sealing compounds.

UV-crosslinkable hotmelt contact adhesives having a particularly balanced property spectrum with regard to melt viscosity, coating behavior, reactivity, tack, cohesion and peeling strength are obtained if the copolymers have K values of from 25 to 45, preferably from 30 to 40, and contain, as copolymerized units, a) from 17 to 88, preferably from 23 to 80, % by weight of isoamyl acrylate,
b) from 5 to 74% by weight of n-butyl acrylate and/or 2-ethylhexyl acrylate and/or isooctyl acrylate and/or n-heptyl acrylate,
c) from 5 to 30% by weight of methyl acrylate and/or ethyl acrylate, preferably from 10 to 20% by weight of methyl acrylate,
d) from 1 to 6, preferably from 1.5 to 4, % by weight of acrylic and/or methacrylic acid and
f) from 0.5 to 1.5% by weight of a copolymerizable benzophenone derivative.

The copolymers (A) are prepared at from 70 to 150° C., preferably from 80 to 120° C., in the presence of from 0.25 to 10% by weight, based on the monomers, of peroxides or azo initiators as polymerization initiators and in the presence of from 0 to 200, preferably from 5 to 100, % by weight, based on the monomers, of inert solvents, i.e. by polymerization in the absence of a solvent, or, preferably, by solution polymerization.

Suitable polymerization initiators are peroxides, for example acyl peroxides, such as benzoyl peroxide, dilauroyl peroxide, didecanoyl peroxide, isononanoyl peroxide, alkyl peresters, such as tert-butyl perpivalate, tert-butyl per-2-ethylhexanoate, tert-butyl permaleate, tert-butyl perisononanoate or tert-butyl perbenzoate, dialkyl peroxides, such as dicumyl peroxide, tert-butyl cumyl peroxide, or di-tert-butyl peroxide and peroxydicarbonates, such as dimyristyl peroxydicarbonate, dicetyl peroxydicarbonate or bis-(4-tert-butylcyclohexyl) peroxydicarbonate, hydroperoxides, such as cumene hydroperoxide and tert-butyl hydroperoxide, and polymerization initiators, such as 3,4-dimethyl-3,4-diphenylhexane and 2,3-dimethyl-2,3-diphenylbutane.

Ketone peroxides, such as methyl ethyl ketone peroxide, acetylacetone peroxide, cyclohexanone peroxide and methyl isobutyl ketone peroxide, are particularly suitable, as well as azoinitiators, for example 2,2'-azobisisobutyronitrile (Porofor N), dimethyl 2,2'-azobisisobutyrate and 4,4'-azobis-(4-cyanovaleric acid). The stated initiators can be used alone or as a mixture.

Preferably used solvents are those boiling within a range from 50 to 150° C., which may also contain small amounts of higher boiling or low boiling components. For example, hydrocarbons, such as toluene and gasolines, which preferably boil within a range from 60° to 120° C., are suitable. Alcohols, such as methanol, ethanol, n-propanol and isopropanol, are particularly interesting solvents, isopropanol and isobutanol and mixtures of these, but in particular isopropanol, being preferred.

Other suitable solvents are ketones, such as acetone or methyl ethyl ketone, and esters, such as ethyl acetate, or mixtures of these or mixtures with isopropanol and/or isobutanol, whose amount is not less than 5, particularly preferably not less than 10, % by weight, based on the solvent mixture.

To carry out the polymerization, it is also possible to add to the reaction mixture compounds which reduce the degree of polymerization, i.e. polymerization regulators. In addition to, in particular, secondary alcohols, these are, for example, mercaptans, such as mercaptoethanol, mercaptosuccinic acid, mercaptoglycerol and 3-mercaptopropyltrimethoxysilane, ethers, such as dioxane and tetrahydrofuran, hydrocarbons, such as isopropylbenzene, and compounds such as bromoform and carbon tetrachloride. Polymerization regulators, for example tetrahydrofuran, are added to the reaction mixture in amounts of 0.01 to 50% by weight, based on the sum of solvents and regulators.

The polymerization is carried out in a conventional manner in a polymerization apparatus, which is generally provided with a stirrer, a plurality of feed vessels, a reflux condenser and heating/cooling and is equipped for working under an inert gas atmosphere and under superatmospheric or reduced pressure. In general, a kettle is used for this purpose. The polymerization is generally carried out to a conversion of the monomers of more than 99.0%, preferably more than 99.9%.

The solvent (mixture) and any volatile components are distilled off after the end of the polymerization, residues being removed under reduced pressure, preferably at above 120° C. However, the volatile components can also be removed in devolatilization apparatuses, such as extruders and falling film evaporators. The amount of volatile components after devolatilization is in general less than 0.2% by weight.

The novel hotmelt contact adhesives can be modified and/or compounded in a conventional manner. Surprisingly, the usual tackifiers, for example hydrocarbon resins, unmodified or modified rosins, terpene/phenol resins, ketone resins or aldehyde resins, can be added to the copolymers (A) in amounts of not more than 50% by weight, or homopolymers, for example poly-(2-ethylhexyl acrylate) and poly-(n-butyl acrylate), as well as plasticizers, for example those based on mono-, di- or polyester compounds, polychlorinated hydrocarbons or liquid paraffins, dyes, pigments or stabilizers or elastomeric substances, such as natural or synthetic rubber, styrene/butadiene copolymers, polyvinyl ethers and polybutadiene oils, which may be added in small amounts.

The novel hotmelt contact adhesives may furthermore be modified by the addition of small amounts of olefinically unsaturated compounds; diolefinically or polyolefinically unsaturated compounds are preferred. For applications as contact adhesive, the addition of more than 10% by weight of diolefinically unsaturated compounds is not generally advisable since the cross-linked coatings show a substantial loss of tack.

Suitable polyolefinically unsaturated compounds are, for example, diesters of (meth)acrylic acid with diols, e.g. 1,4-butanediol diacrylate, and di(meth)acrylates which are derived from polyetherols, for example polytetrahydrofuran di(meth)acrylate.

Further modification of the novel hotmelt contact adhesives can be achieved by the addition of not more than 5% by weight of aromatic ketones, for example benzophenone and benzophenone derivatives, such as 4-hydroxybenzophenone or 4-benzophenonecarboxylic acid.

Benzophenone derivatives which contain one or more olefinically unsaturated groups are advantageously used. Monoolefinically unsaturated benzophenone derivatives are, for example, the monomers of group (f).

Hotmelt contact adhesives should be capable of being processed at very low temperatures. Some of the novel hotmelt contact adhesives can be processed at less than 80° C., so that plasticized PVC films or polypropylene films can also be coated.

Surprisingly, the novel hotmelt contact adhesives can also be applied directly to paper or fiber webs. In particular, it is also possible to impregnate the fiber webs with the liquid hotmelt contact adhesives, squeeze off excess adhesive and then expose the impregnated fiber web on both sides. A batchwise or continuous process may be used.

The novel hotmelt contact adhesives also permit the crosslinking of relatively thick layers of, for example, more than 2 mm.

Surprisingly, the properties of the novel hotmelt contact adhesives can readily be tailored to the required applications by the choice of the monomer composition. For example, labels which can be peeled off completely from various substrates (non-stick labels, non-stick self-adhesive tapes) can readily be produced.

The novel hotmelt contact adhesives can be processed in a conventional manner. In general, melt temperatures of not more than 130° C., preferably below 100° C., very particularly preferably below 80° C., are sufficient.

The novel hotmelt adhesives exhibiting flow at room temperature can easily be applied to sheet-like structures, such as films, paper, board, as well as wood, metals, rubber and glass, using the conventional apparatuses for the application of hotmelt adhesives, for example nozzles, rollers or knife coaters, or by the screen printing method. Films which are suitable as substrates may consist of, for example, polyethylene, polyamides, polyethylene glycol terephthalate, polypropylene, polyvinyl chloride or aluminum.

The coatings obtained with the hotmelt contact adhesives can be crosslinked by exposure to ultraviolet light, giving coatings which exhibit good adhesion and high cohesion and have very good tack and very good peeling strength in conjunction with excellent aging resistance.

The coating may be exposed to commercial UV lamps, for example medium pressure mercury lamps having a radiant power of 80 watt/cm or higher. Electrodeless UV lamps having a radiant power of, for example, 80 watt/cm or 120 watt/cm can also be used (fusion system). Hotmelt contact adhesives applied as spots can be crosslinked by exposure to UV light from UV spotlamps or small UV lamps. An overview is given, for example, in the book by Roger Philips, "Sources and Applications of Ultraviolet Radiation", Academic Press, London, New York 1983.

The speed at which the coated substrates can pass through the UV exposure zone to achieve adequate crosslinking for the particular application depends on, inter alia, the thickness of the coating, the radiant power and the number of UV lamps and their distance from the surface of the coating. A larger number of lamps and a greater radiant power generally permits a higher production rate.

In particular, exposure may also be carried out simultaneously from the coating side and from the substrate side if substrates (films) which are sufficiently UV-transparent are used. Furthermore, the exposure process can be interrupted at any time and then continued again.

Adhesion tests

To carry out the adhesion tests, substrates (polyethylene glycol terephthalate films, Hostaphan ® RN 36 from Hoechst) are coated on a heatable coating table at 95° C. with the hotmelt contact adhesives so that the coating weight is 25 g/m$^2$.

The coated films are placed on the running continuous belt of a UV exposure unit and are passed, at a speed of 20 m/min and at a distance of 11 cm, below two medium pressure mercury lamps, each having a radiant power of 80 watt/cm. Exposure is carried out under atmospheric oxygen.

The exposed films are then covered with paper having an abhesive coating (silicone paper) and the adhesion tests are carried out. The films produced in this manner are cut into 2 cm wide strips and these strips are applied, with the contact adhesive layer, to a chromium-plated brass sheet. The sheet with the strip is then stored for 24 hours at 23° C. and 65% relative humidity.

To measure the peeling strength, the test strips are peeled off backward and parallel to the adhesive layer, at a speed of 300 mm/min. The force required for this purpose is measured.

In the measurement of the shear strength, an adhesively bonded area of 20×25 mm is cut out, the sheet is clamped vertically and the projecting part of the self-adhesive strip is loaded with a weight of 1 kg. The time taken to break the adhesive bond is determined. The measurement is carried out at 23° C. and 50° C. All measurements are carried out five times.

In the Examples which follow, parts and percentages are by weight. The K values are determined according to DIN 53,726 in 1% strength solution of tetrahydrofuran at 25° C.

The Staudinger index (viscosity number) is determined in tetrahydrofuran at 25° C. by known methods (for example G.V. Schulz and H.-J. Cantow in Houben-Weyl, Methoden der organischen Chemie, G. Thieme Verlag, 1955, Vol. 3/1, pages 431–445, and B. Vollmert: Grundriss der makromolekularen Chemie, Volume III, page 55 et seq.

EXAMPLE 1

150 g of a mixture of 500 g of isoamyl acrylate, 300 g of n-butyl acrylate, 175 g of methyl acrylate, 25 g of acrylic acid and 10 g of para-methacryloxybenzophenone are refluxed together with 160 g of ethyl acetate, 50 g of tetrahydrofuran and 9 g of tert-butyl per-2-ethylhexanoate for 20 minutes. The remainder of the monomer mixture is added in the course of 3 hours and at the same time a solution of 5 g of tert-butyl per-2-ethylhexanoate in 40 g of ethyl acetate is added in the course of 4 hours, the reaction mixture being kept gently refluxing. Stirring is then carried out for 4 hours.

After distillation of the solvent and removal of volatile components at 130° C. under reduced pressure, a copolymer having a K value of 35.4 is obtained.

EXAMPLE 2

150 g of a mixture of 870 g of isoamyl acrylate, 100 g of methyl acrylte, 30 g of acrylic acid and 7.5 g of the monoester of 4-benzophenonecarboxylic acid with 1,4-butanediol monoacrylate are refluxed gently together with 210 g of isopropanol and 10 g of tert-butyl per-2-ethylhexanoate for 15 minutes. The remainder of the monomer mixture is added in the course of 3 hours and at the same time a solution of 5 g of tert-butyl per-2-ethylhexanoate in 40 g of ethyl acetate is added in the course of 4 hours, the reaction mixture being kept gently refluxing. Stirring is then carried out for 4 hours.

After distillation of the solvent and removal of volatile components at 130° C. under reduced pressure, a copolymer having K value of 30 is obtained.

EXAMPLES 3 TO 5

Copolymers having the following composition are prepared similarly to Example 2:

| Example | Copolymer Composition | Benzophenone Derivative | K value |
|---|---|---|---|
| 3 | 96.0% by weight of 2-EHA<br>3.0% by weight of Aa | 1.0 p-methacryloxy-benzophenone | 33 |
| 4 | 35.25% by weight of 2-EHA<br>62.0% by weight of n-BA<br>2.0% by weight of Aa | 0.75 p-methacryloxy-benzophenone | 37 |
| 5 | 25.0% by weight of i-AA<br>50.5% by weight of n-BA<br>10% by weight of 2-EHA<br>10.0% by weight of MA<br>3.0% by weight of MAa | 1.5 (2-hydroxy-3-methacryloxy)-propyl ortho-benzoyl-benzoate (according to Example 1 of U.S. Pat. No. 3,429,852) | 30 |

Abbreviations:
2-EHA = 2-ethylhexyl acrylate
i-AA = isoamyl acrylate
n-BA = n-butyl acrylate
MA = methyl acrylate
Aa = acrylic acid
MAa = methacrylic acid

EXAMPLES 6 TO 8

The following mixtures with the conventional tackifier, Foral 85 (Hercules), were prepared.

| Mixture | Copolymer | Foral 85 |
|---|---|---|
| M 1 | 100 g according to Example 1 | 12.5 g |
| M 2 | 100 g according to Example 3 | 10.0 g |
| M 3 | 100 g according to Example 4 | 12.5 g |

The results of the exposure tests with the copolymers from Example 1 to 5 and the mixtures from Examples 6 to 8 are shown in the Table below.

TABLE

Results of the performance tests for use as contact adhesives

| Copolymer/mixture from Example | Shear strength [h] 23° C. | Shear strength [h] 50° C. | Peeling strength [N/2 cm] after 24 hours | Tack*) [Rating] |
|---|---|---|---|---|
| 1 | >100 | >6 | 9.6 | Very good |
| 2 | >100 | >24 | 12.5 | Very good |
| 3 | 1.5 | — | 10.0 | Very good, soft |
| 4 | 2 | <0.5 | 11.5 | Very good, soft |
| 5 | >24 | >4 | 8.5 | Good |
| 6 | >24 | >4 | 13.0 | Very good |
| 7 | <0.5 | — | — | — |
| 8 | <0.5 | — | — | — |

*)The tack was assessed by a group.

We claim:
1. A material which is crosslinkable by ultraviolet radiation under atmospheric oxygen and is based on (meth)acrylate copolymers having a K value of from 10 to 100, obtained by free radical polymerization, in the presence or absence of a solvent, of
  a) from 5 to 97.4% by weight of isoamyl acrylate, isoamyl methacrylate, or mixtures thereof, b) from 0 to 89.9% by weight of (meth)acrylates whose homopolymers have a glass transition temperature below −30° C., c) from 2.5 to 30% by weight of $\alpha,\beta$-monoolefinically unsaturated compounds whose homopolymers have a glass transition temperature above −30° C., d) from 0 to 10% by weight of monoolefinically unsaturated acids, their anhydrides or mixtures thereof, and e) from 0 to 20% by weight of further olefinically unsaturated monomers having one or more of the following functional groups: hydroxyl, amide, epoxide, ether, ester, urethane, urea, primary, secondary and tertiary amine and ether groups, and f) from 0.1 to 5% by weight of a copolymerizable benzophenone derivative or acetophenone derivative, the sum of the percentages by weight X (=a+b+c+d+f) being 100 in each case.

2. A material as claimed in claim 1, wherein the copolymerizable benzophenone derivative used is 4-(meth)acryloxybenzophenone.

3. A material as claimed in claim 1, wherein the copolymerizeable benzophenone derivative used is a mixture of 2-(meth)acryloxybenzophenone and 4-(meth)acryloxybenzophenone.

4. A material as claimed in claim 1, wherein the copolymerizable benzophenone derivative used is 4-acryloxybutyl para-benzoylbenzoate.

5. A material as claimed in claim 1, wherein the copolymerizable benzophenone derivative used is 2-acryloxybutyl ortho-benzoylbenzoate.

6. A material as claimed in claim 1, wherein the copolymerizable benzophenone derivative used is (2-hydroxy-3-methacryloxy)-propyl ortho-benzoylbenzoate.

7. A material as claimed in claim 1, which has a Staudinger index of from 0.11 to 0.49 100 ml/g.

8. A material as claimed in claim 1, wherein the amount of isoamyl acrylate, isoamyl methacrylate or mixtures thereof ranges from 15–97.4% by weight.

9. A material as claimed in claim 8, wherein the amount of isoamyl acrylate, isoamyl methacrylate or mixtures thereof ranges from 25–95% by weight.

* * * * *